US011263687B2

(12) United States Patent
Sussman et al.

(10) Patent No.: US 11,263,687 B2
(45) Date of Patent: Mar. 1, 2022

(54) SYSTEM FOR SECURE MANAGEMENT OF INVENTORY AND PROFILE INFORMATION

(71) Applicant: RingIT, Inc., Syracuse, NY (US)

(72) Inventors: Andrew D. Sussman, Jamesville, NY (US); Gregory M. Moore, Baldwinsville, NY (US); Pamela Dillon, New York, NY (US); Stephen Dillon, New York, NY (US)

(73) Assignee: RingIT, Inc., Syracuse, NY (US)

( * ) Notice: Subject to any disclaimer, the term of this patent is extended or adjusted under 35 U.S.C. 154(b) by 0 days.

(21) Appl. No.: 17/241,500

(22) Filed: Apr. 27, 2021

(65) Prior Publication Data

US 2021/0334879 A1 Oct. 28, 2021

Related U.S. Application Data

(60) Provisional application No. 63/016,413, filed on Apr. 28, 2020.

(51) Int. Cl.
*G06Q 30/00* (2012.01)
*G06Q 30/06* (2012.01)
(Continued)

(52) U.S. Cl.
CPC ..... *G06Q 30/0631* (2013.01); *G06F 16/3344* (2019.01); *G06Q 10/087* (2013.01); *G06Q 30/0282* (2013.01)

(58) Field of Classification Search
CPC ............ G06Q 30/02; G06Q 30/0631
See application file for complete search history.

(56) References Cited

U.S. PATENT DOCUMENTS 8,321,261 B2  11/2012  Gross
8,751,429 B2   6/2014  Dillon et al.
(Continued)

FOREIGN PATENT DOCUMENTS

WO   2014153445 A1   9/2014

OTHER PUBLICATIONS

Gustafsson, Emmelie, Digital model-driven retail supply chain management, 2019, ProQuest Dissertations Publishing (Year: 2019).*

*Primary Examiner* — Brittney N Miller
(74) *Attorney, Agent, or Firm* — Fox Rothschild LLP

(57) ABSTRACT

A secure inventory management system includes a product information data store that holds inventory information for products that are associated with one or more channels, as well as a consumer profile data store holding consumer-product purchase event information for each channel. The system also includes a channel manager user interface via which the system will receive a consumer identifier from a channel manager user for a first channel, identify products that are in an inventory of the first channel, and use the consumer profile data to generate recommendations for products in the inventory. At least some of the consumers, and at least some of the products, will be associated with multiple channels. The system maintains security and privacy of information so that only aggregate supplier information is shared across channels, and no personally identifiable consumer information is shared with anyone who is not authorized to access the information.

16 Claims, 14 Drawing Sheets

(51) Int. Cl.
  *G06F 16/33*   (2019.01)
  *G06Q 10/08*   (2012.01)
  *G06Q 30/02*   (2012.01)

(56) References Cited

U.S. PATENT DOCUMENTS

| | | |
|---|---|---|
| 8,838,517 B2 | 9/2014 | Dillon et al. |
| 9,026,484 B2 | 5/2015 | Dillon et al. |
| 9,449,077 B2 | 9/2016 | Dillon et al. |
| 10,127,598 B2 | 11/2018 | Dillon et al. |
| 10,460,246 B2 | 10/2019 | Dillon et al. |
| 2002/0111899 A1 | 8/2002 | Veltre et al. |
| 2003/0028451 A1* | 2/2003 | Ananian ............ G06Q 30/0615 705/26.42 |
| 2004/0128156 A1* | 7/2004 | Beringer ............ G06Q 10/0633 705/319 |
| 2004/0181445 A1 | 9/2004 | Kolsky et al. |
| 2006/0041548 A1* | 2/2006 | Parsons ................ G06F 16/954 |
| 2009/0171745 A1* | 7/2009 | Todd ...................... G06Q 30/06 705/26.1 |
| 2009/0210321 A1 | 8/2009 | Rapp |
| 2012/0226698 A1 | 9/2012 | Silvestre et al. |
| 2013/0080438 A1 | 3/2013 | Tompkins |
| 2015/0235136 A1* | 8/2015 | Dillon ...................... G06N 5/02 706/46 |
| 2016/0070449 A1 | 3/2016 | Christiansen et al. |
| 2017/0148084 A1 | 5/2017 | Axelsson et al. |
| 2020/0074517 A1 | 3/2020 | Meier et al. |
| 2020/0294108 A1* | 9/2020 | Perry ................ G06Q 30/0201 |
| 2020/0387954 A1 | 12/2020 | Sadhankar et al. |
| 2021/0012281 A1* | 1/2021 | Paquin ................ G06Q 10/087 |
| 2021/0056567 A1* | 2/2021 | Hossain ............ G06Q 30/0282 |

\* cited by examiner

FIG. 2

| supplier_id | mapping_id | Platform ID | channel_id | Value | Landing_url | Image_url | Wine_name |
|---|---|---|---|---|---|---|---|
| 172878 | 20 | 429638 | 714 | 66484 | https://www.aj-IP.com/A-t... | NULL | A to Z Riesling 750 ml |
| 172877 | 400 | 608402 | 2 | 119858 | https://www.w-r-ip.com/pr... | NULL | 2017 Bruno Ciacosa Barolo Falletto    (750ml) |
| 172876 | 400 | 608401 | 2 | 119816 | https://www.w-r-ip.com/pr... | NULL | 2018 Dominus Estate Napanook Red Wine Napa Valley (750ml) |
| 172875 | 400 | 608400 | 2 | 119866 | https://www.w-r-ip.com/pr... | NULL | 2017 Bruno Giacosa Barbaresco Rabaja    (magnum) |
| 172874 | 400 | 608400 | 2 | 119854 | https://www.w-r-ip.com/pr... | NULL | 2017 Bruno Giacosa Barbaresco Rabaja    (750ml) |

FIG. 3A

| import_id | name | created_at | updated_at | number | mapping_id |
|---|---|---|---|---|---|
| 3460193 | 6998 merchant_vintage_id | 2021-04-21 03:01:23 | 2021-04-21 03:01:23 | 0 | 400 |
| 3460194 | 6998 sku | 2021-04-21 03:01:23 | 2021-04-21 03:01:23 | 1 | 21 |
| 3460195 | 6998 country_state | 2021-04-21 03:01:23 | 2021-04-21 03:01:23 | 2 | 16 |
| 3460196 | 6998 region | 2021-04-21 03:01:23 | 2021-04-21 03:01:23 | 3 | 14 |
| 3460197 | 6998 varietal | 2021-04-21 03:01:23 | 2021-04-21 03:01:23 | 4 | 42 |
| 3460198 | 6998 vintage | 2021-04-21 03:01:23 | 2021-04-21 03:01:23 | 5 | 41 |
| 3460199 | 6998 name | 2021-04-21 03:01:23 | 2021-04-21 03:01:23 | 6 | 12 |
| 3460200 | 6998 stock | 2021-04-21 03:01:23 | 2021-04-21 03:01:23 | 7 | NULL |
| 3460201 | 6998 price | 2021-04-21 03:01:23 | 2021-04-21 03:01:23 | 8 | NULL |
| 3460202 | 6998 Cleaned Wine Name | 2021-04-21 03:04:26 | 2021-04-21 03:04:26 | 99 | 106 |

FIG. 3B

Collection: April Wine List

Basic | Date | Traits | Advanced

Currency: USD

Display Wine Numbers: Overall Numbering (1...N)

Status: ◯ Published

Visibility: ◯ Private W/ Code

Blind Testing: ◯ Wines Displayed

Location Based Recommendations: ◯ Include This Collection

Display:
◯ Group Headings
◯ Price
◯ Storage Location
◯ Quantity

[SUBMIT]

| chant_user_email_address | created_at | updated_at | profile_id | role | purchases_collection_id | merged_profile_id |
|---|---|---|---|---|---|---|
| ercustomer_11134@w-r-ip.com | 2020-08-09 16:41:22 | 2020-08-12 22:26:15 | 122714 | customer | 481487 | 122701 |
| ercustomer_11133@w-r-ip.com | 2020-08-09 16:41:20 | 2020-08-12 22:03:02 | 122713 | customer | 481486 | 122702 |
| ercustomer_11132@w-r-ip.com | 2020-08-09 16:41:20 | 2020-08-12 21:42:24 | 122712 | customer | 481485 | 122703 |
| ercustomer_11131@w-r-ip.com | 2020-08-09 16:41:19 | 2020-08-12 17:49:31 | 122709 | customer | 481483 | 122704 |
| ercustomer_11130@w-r-ip.com | 2020-08-09 16:41:18 | 2020-08-12 17:43:35 | 122708 | customer | 481482 | 122705 |
| ercustomer_11129@w-r-ip.com | 2020-08-09 16:41:17 | 2020-08-12 16:43:02 | 122697 | customer | 481481 | 122698 |
| ercustomer_11128@w-r-ip.com | 2020-08-09 16:41:16 | 2020-08-12 15:51:02 | 122696 | customer | 481480 | 122695 |
| ercustomer_11127@w-r-ip.com | 2020-08-09 16:41:15 | 2020-08-12 15:38:53 | 122693 | customer | 481479 | 122694 |
| ercustomer_11126@w-r-ip.com | 2020-08-09 16:41:14 | 2020-08-11 13:45:05 | 122593 | customer | 481444 | 122592 |
| ercustomer_11125@w-r-ip.com | 2020-08-09 16:41:14 | 2020-08-20 09:10:44 | 122923 | customer | 481440 | 122590 |
| ercustomer_11124@w-r-ip.com | 2020-08-09 16:41:13 | 2020-08-11 13:00:10 | 122585 | customer | 481439 | 122586 |

Campaign: New Arrivals Email #12

RE-STAGE | TEST CAMPAIGN | FINISH

Overview

Recommending Products From:

New and Notable

New Arrivals April 14
Remove Collection

⚙ Settings

Campaign

Product Price Range Filter
Price: $0 - $250+
$0 ──────○────── $250+

◯ Customer Price Filtering

◯ Exclude Previous Purchases

Exclude Previous Recommendations:
Select Duration
3 Months

Email Marketing Software

Subscription List(s):
SelectLists(s)
Wine Ring Developer Team, Argentina, Australia, Austria, ✕
California, Chile, France, Germany, Italy, Japan, Liquor,
New Zealand, Oregon, Other Imports, Other USA,
Portugal, South Africa, Spain, Washington ◯ Send to Individual Customers 0 Customers Selected | REMOVE ALL CUSTOMERS

1001

```
1  {
2      {
3          "merchant_vintage_id" : "114770",
4          "sku" : "858666003060"
5          "country_state" : "PORTUGAL",
6          "region" : "",
7          "varietal": "OTHER RED",
8          "vintage" : "2016",
9          "name" : "2016 Herdade Do Esporao Reserva Red 75
10         "stock" : "12.0",
11         "price" : "19.9900"
12     },
13     {
14         "merchant_vintage_id" : "114769",
15         "sku" : "8573",
16         "country_state" : "CALIFORNIA",
17         "region" : "SANTA BARBARA",
18         "varietal": "SAUVIGNON BLANC",
19         "vintage" : "2019",
20         "name" : "2019 Margerum Sauvignon Blanc Sybarite
                    Happy Canyon 750ml",
21         "stock" : "36.0",
22         "price" : "17.9900"
23     },
24     {
25         "merchant_vintage_id" : "114751",
26         "sku" : "669576019399",
27         "country_state" : "CALIFORNIA",
28         "region" : "NAPA",
29         "varietal": "SAUVIGNON BLANC",
```

SYSTEM FOR SECURE MANAGEMENT OF INVENTORY AND PROFILE INFORMATION

RELATED APPLICATIONS AND CLAIM OF PRIORITY

This patent document claims priority to U.S. provisional patent application No. 63/016,413, filed Apr. 28, 2020. The disclosure of the priority application is fully incorporated into this document by reference.

BACKGROUND

This document describes methods and systems for maintaining data security in data management and distribution systems, and in particular for inventory and customer relationship management systems such as those that are used by producers, retailers and distributors of consumable items.

Many inventory management systems are available to help producers, distributors and retailers of products identify and manage products in their inventory at various locations. While these systems are helpful in managing the intake and storage of items, they are generally not useful in managing the distribution of items to actual and potential customers. Separate customer relationship management (CRM) systems are used to manage the customer experience. However, CRM systems typically only manage a customer's contact information and purchase history, and they cannot be used to match appropriate customers with particular items in an inventory.

In addition, CRM systems are typically limited to a single entity or group of associated entities, such as a retail store chain, hotel or other hospitality chain or group, or restaurant chain or group. Due to privacy and data security concerns, entities such as retailers do not share CRM or product data with other retailers. In addition, when distributors and producers provide supply chain-related data to their business customers, they typically must create separate data sets for each customer to ensure that each customer gets secure access to only its data and not data that is associated with other customers. Thus, while CRM systems may be secure in that they maintain a particular entity's data behind a firewall, they cannot sufficiently enable certain aspects of the data to be shared, nor can they make connections of appeal between suppliers and customers while maintaining reasonable privacy of the customer or business that is associated with the data.

For example, United States Patent Application Publication No. 2021/0012281, filed Jul. 9, 2019 and published Jan. 14, 2021, discloses a method for electronic commerce order management in which merchants use multiple channels can maintain online storefronts. The system uses an inventory database with inventory information for multiple channels or locations. However, systems such as these require each channel manager to distinctly define the products in its inventory. While this maintains security of each channel manager's inventory data, it slows the data ingestion process; it requires a large amount of storage capacity to create multiple, channel-specific profile records for products that multiple channels may carry; and it does not allow the system or users to leverage non-sensitive information that could be shared across multiple channels.

Further, in an era in which government regulations, health reasons (such as pandemics) and safety issues may limit consumers' ability to physically browse a product inventory, technical solutions are needed to help suppliers identify products to recommend to consumers, especially where the inventory is large and cannot practically be retained in the memory of an individual human who is working to fulfill a consumer's order.

This document describes improved inventory management and CRM methods and systems that are directed to addressing at least the technical problems described above.

SUMMARY

In various embodiments, an inventory management system is disclosed. The system includes a processor and a computer readable memory device containing a product information data store. The product information data store includes inventory information for various products, each of which is associated with one or more channels. The system also includes a computer-readable memory device containing a consumer profile data store. The consumer profile data store holds consumer-product interaction records, each of which comprises consumer purchase or other interaction event information and product rating information for one or more of the products, and each of which is associated with one of the channels. The system also includes a computer-readable memory device containing programming instructions that are configured to cause the processor to generate and output, on a display device, a channel manager user interface via which the system will: (i) receive, from a channel manager user for a first channel, an identifier for a consumer; (ii) access the consumer profile data store and retrieve secure profile data for the consumer, wherein the secure profile data comprises purchase records that are associated with a token for the first channel and does not include any product interaction records that are associated with tokens for any other channel; (iii) access the product information data store to identify products that are in an inventory of the first channel; (iv) use the consumer profile data, including both the secure profile data and profile data that is associated with tokens for one or more other channels, to generate one or more product recommendations for the consumer, wherein the one or more product recommendations are for one or more products in the inventory; and (v) output the one or more product recommendations on the display device.

In some embodiments, the programming instructions to output the secure profile data on the display device comprise instructions to display information for a plurality of products that are in the product interaction records for the consumer. For each product for which the consumer profile data store holds a rating received from the consumer, the system may display the rating with the information for that product. For any product for which the consumer profile data store does not hold a rating received from the consumer, the system may generate a proxy rating for the unrated product and display the proxy rating with the information for the unrated product.

To generate the proxy rating, the system may use a function of a number of times that the consumer purchased the unrated product to generate the proxy rating. In addition or alternatively, to generate the proxy rating the system may use a function of a date on which the consumer purchased the unrated product. In addition or alternatively, to generate the proxy rating the system may access the product information data store, retrieve characteristic values for the unrated product, and determine whether the retrieved characteristic values for the product correspond to one or more indicators of preference in a preference model for the consumer, wherein the preference model represents associations between the person's ratings of products and a plurality of product characteristics. In addition or alternatively, to generate the proxy rating the system may receive, from the supplier, one or more indicia (i.e., digital signals) corresponding to a non-purchase interaction by the customer with the unrated product. Upon determining that the consumer interacted with the unrated product, the system may assign a favorable proxy rating to that product.

In some embodiments, the system may include additional programming instructions that are configured to cause the processor to generate and output, on a display device, a channel creation user interface. Through the channel creation user interface, the system will receive, from a user, product information for various inventoried products. For each inventoried product for which the system receives product information, the system may determine whether the inventoried product is already in the product information data store. If the inventoried product is not already in the product information data store, the system may add the product information for the inventoried product to the product information data store. On the other hand, if the inventoried product is already in the product information data store, the system may present additional product information from the product information data store to the user to accept or modify, and upon receiving confirmation from the user the system may update the data store to include the product information for the inventoried product and associate the inventoried product with the first channel. To update the data store, the system may add a record for the inventory product to the data store in which the record includes (i) a channel ID for the first channel; and (ii) mapping IDs for a supplier that is associated with the channel, in which the mapping IDs associate data elements in the record to data element fields in the data store. The system also may associate the inventoried product with an address for a landing page for the inventoried product on a website of the first channel.

In some embodiments, when receiving the product information for inventoried products and determining whether the inventoried products are in the product information data store, the system may, for at least a first product of the inventoried products: (i) cause a high definition camera to capture an image that includes the first product; (ii) define a bounding box around a section of the first product that contains product indicia; (iii) apply a recognition model to the image to extract the product indicia from a section of the image that is within the bounding box; and (iv) use a classifier to determine whether the product information data store includes an inventoried product with identifying information that is a likely match for the extracted product indicia of the first product.

In some embodiments, the system may include additional programming instructions that are configured to cause the processor to generate and output a customer selection manager. Through the customer selection manager, the system may receive, via the user interface, a selection of a consumer. The system also may receive, via the user interface, one or more product screening criteria. The system may then use the consumer profile data, including both the secure profile data and profile data that is associated with tokens for one or more other channels, to generate one or more product recommendations for the consumer. The product recommendations will be for products that are in the inventory and that meet the screening criteria. The system may then automatically generate a message that includes the product recommendations for the consumer, and it may transmit the message to the consumer.

In some embodiments, the system may include additional programming instructions that are configured to cause the processor to generate and output a customer selection manager. Through the customer selection manager, the system may receive, via the user interface, a selection of a product, and it may access and use the consumer profile data to identify one or more consumers who are associated with the channel. For each of the identified consumers, the system may generate a predicted rating for the product. The system may select, from the identified consumers, a group of consumers whose predicted rating exceeds a threshold. The system may then automatically generate a message about the identified product for the group of consumers; and it may transmit the message to the group of consumers.

In some embodiments, when the system generates one or more product recommendations for the consumer, the system may determine that the consumer has requested a product of a first product category. The system may then identify a second product category, and it may use one or more attributes of the requested product and the secure profile data to select, from the inventory, one or more products of the second product category. The system may then include the selected one or more products in the one or more product recommendations.

In some embodiments, when accessing the product information data store to identify products that are in the inventory of the first channel, the system may identify a channel ID for the first channel. The system may then extract, from the product information data store, product data records that are associated with the channel ID and not any product data records that are associated with any other channel ID.

Optionally, to identify products that are in the inventory of the first channel, the system may identify a channel ID for the first channel and extract, from the product information data store, product data records that are associated with the channel ID and not any product data records that are associated with any other channel ID.

Optionally, the channel manager user interface may include a channel collection user interface that comprises one or more actuators by which the system will receive, from a user, for first channel, a definition for the first channel, wherein the definition for the channel comprises one or more retail locations. The system also may receive a definition for a collection of products that are available from the channel, wherein the definition for the collection comprises product description information received from a product description fields, along with one or more access restrictions for the collection.

Optionally, the system also may receive, via a data feed from each of multiple suppliers, inventory information for products that the suppliers carry. The system may extract, from each data feed, the inventory information for each of the suppliers. The system may update the product information data store to include the extracted inventory information for each product that is associated with the supplier in the product information data store. To extract the inventory information from each data feed, the system may, for each data feed, use semantic synonyms to map each of a plurality of data fields in the data feed to a pre-defined field mapping that matches a system field in the data store. The system may then extract the data from each of the mapped data fields, and save the data to a matched system field.

In other embodiments, an inventory management system includes a processor, and a computer readable memory device containing a product information data store with inventory information for multiple products, wherein each product is associated with one or more channels. The system also includes a computer-readable memory device containing programming instructions that are configured to cause the processor to generate and output, on a display device, a channel manager user interface via which the system will receive, from a channel manager user for a first channel, data for a new product listing for a first consumable item. Upon receipt of the data, the system may search the product information data store for candidate products having associated data that semantically matches the data for the new product listing. Upon identifying a candidate product having associated data that semantically matches the data for the new product listing, the system may automatically populate the new product listing with data for the candidate product. Then, when the system receives, from a channel manager user, an acceptance or a correction of the new product listing, it will save the new product listing with the data for the candidate product to the product information data store. The saved data will include a platform ID from the associated data for the candidate and a channel ID for the first channel.

Optionally, the system also may, upon receipt of a query from the channel manager user for the first channel via the channel manager user interface: (i) identify the channel ID for the first channel; and (ii) extract, from the product information data store, product data records that are responsive to the query and associated with the channel ID, and not any product data records that are associated with any other channel ID.

Optionally, the system may receive, via a data feed from a supplier, updated inventory information for various products. When this happens, the system may use semantic analysis to extract, from each data feed, the updated inventory information. The system may use a mapping ID for the supplier to identify product data records for the products having the updated inventory information. The system may then update the identified product data records in the product information data store to include the updated inventory information. To use semantic analysis to extract the updated inventory information from each data feed, the system may use semantic synonyms to map each of a plurality of data fields in the data feed to a pre-defined field mapping that matches a system field in the data store. The system may then extract the data from each of the mapped data fields and save the data to a matched system field.

In other embodiments, an inventory management system for consumable items, includes a processor, and a computer readable memory device containing a product information data store. The product information data store includes inventory information for various products, and each product is associated with one or more channels. The system also includes a computer-readable memory device containing a consumer profile data store, wherein the consumer profile data store holds data for consumer-product interaction events, which comprises consumer purchase or other product interaction records and product rating information for one or more of the products, and each of which is associated with one of the channels. This embodiment of the system also includes a computer-readable memory device containing programming instructions that are configured to cause the processor to generate and output, on a display device, a channel manager user interface. The channel manager interface will be an interface via which the system will receive, for a first channel, data for a new product listing for a first consumable item. The system will search the product information data store for candidate products having associated data that semantically matches the data for the new product listing. Upon identifying a candidate product having associated data that semantically matches the data for the new product listing, the system may automatically populate the new product listing with data for the candidate product. When the system receives an acceptance or a correction of the new product listing, it will save the data to the product information data store. The saved data will include a platform ID from the associated data for the candidate and a channel ID for the first channel. Then, when the system receives an identifier for a consumer from a channel manager user for the first channel, the system will access the consumer profile data store and retrieve secure profile data for the consumer. The retrieving accesses only purchase records that are associated with a token for the first channel and excludes any purchase records that are associated with tokens for any other channel. The system will then access the product information data store to identify products that are in an inventory of the first channel. The system will use the consumer profile data, including both the secure profile data and profile data that is associated with tokens for one or more other channels, to generate one or more product recommendations for the consumer. The one or more product recommendations will be for one or more products in the inventory. The system will output the one or more product recommendations on the display device.

BRIEF DESCRIPTION OF THE DRAWINGS

FIG. 2 illustrates a channel creation user interface.

FIGS. 3A and 3B illustrate association of a channel's product data with platform-defined data fields.

FIG. 5 illustrates a channel collection user interface.

FIG. 6 illustrates a channel manager user interface.

FIG. 7 illustrates a data structure by which the system can securely separate secure profile data for a particular channel from profile data for other channels.

FIG. 10 illustrates an example communication manager user interface.

FIG. 11 illustrates product information that may be extracted from a supplier inventory data feed and stored in a structured data set.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

Additional terms that are relevant to this disclosure will be defined at the end of this Detailed Description.

Figure 1:
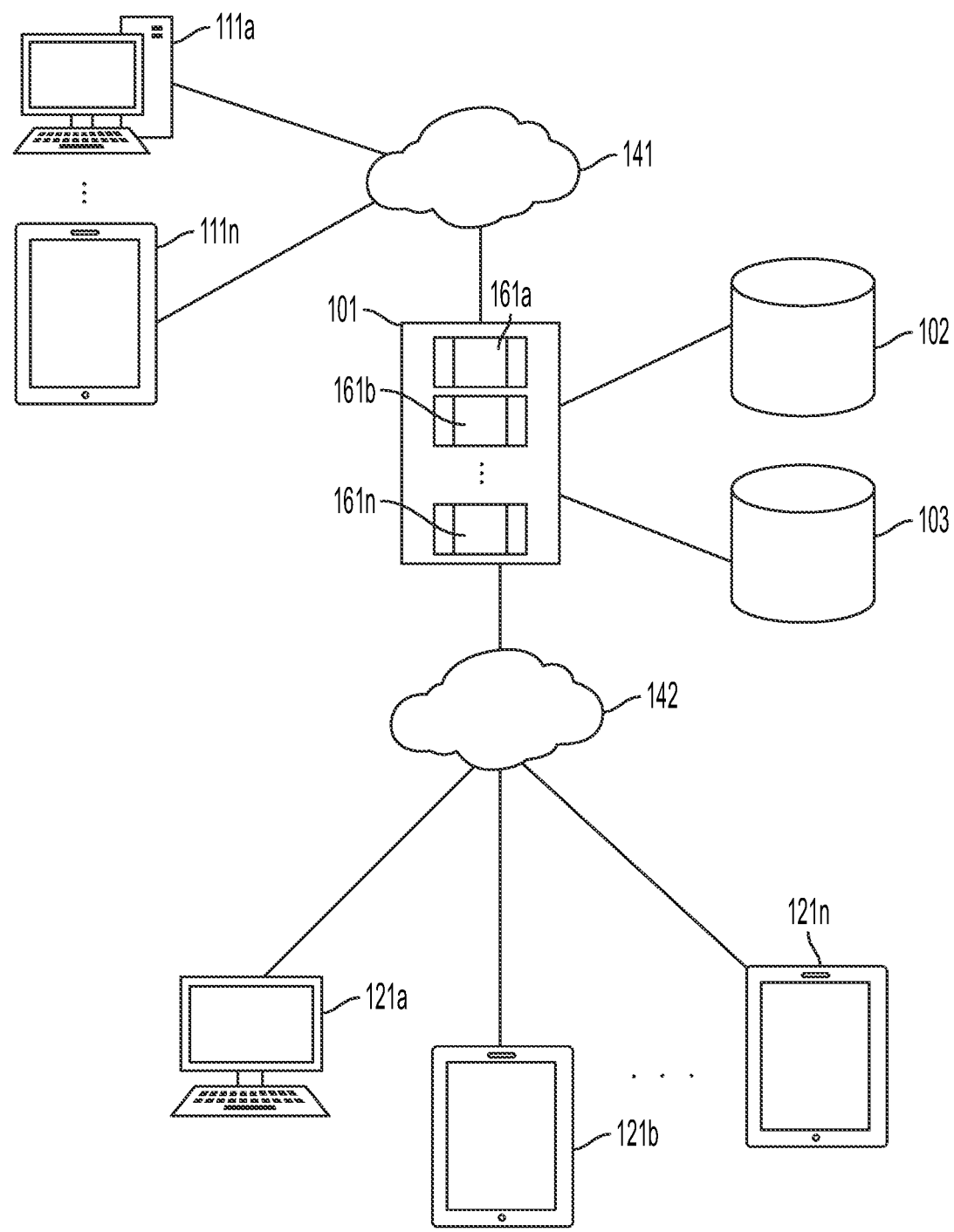
FIG. 1 illustrates example components of a system for providing secure access to, and distribution of, inventory and profile information.

FIG. 1 illustrates example components of a system for providing secure access to, and distribution of, inventory and customer profile information in a product management and distribution system. A server 101, which may include one or more centrally located or distributed computing devices, includes or has access to a consumer profile data store 102 and a product information data store 103. Any number of product supplier electronic devices 111a . . . 111n may supply the server 101 with product information via one or more communication networks 141, 142. A product supplier electronic device is an electronic device operated by a supplier of products in a supply chain, such as a retailer, a restaurant or bar, a hotel, another type of hospitality service provider, an importer, a distributor or a producer of the products. For example, if the product is a wine, spirit or other beverage, the product supplier may provide the central server with product-specific information such as product name, category, type, vintage (i.e., year made), an identification code such as a stock keeping unit (SKU) number or a vendor-specific code (such as an ASIN code as is used by Amazon.com), a suggested retail price and/or other information. Some of the supplier electronic devices, and especially portable devices such as mobile phones, tablet computing devices, or electronic scanning devices may be equipped with a high definition camera for capturing product images, as will be described in more detail below.

One or more consumer electronic devices 121a . . . 121n also may access the server 101 via one or more communication networks 141, 142. Consumer electronic devices may be those used by actual product consumers in some situations. In other situations a "consumer" may be a business entity that is between the ultimate consumer and an upstream supplier in the supply chain. Thus, some electronic devices (such as those used by retailers) may be considered to be both consumer electronic devices and supplier electronic devices, with the designation at a given point in time depending on the context in which the devices are being used to provide or seek information. This will be described in more detail below.

The server 101 may associate consumers, suppliers and product information with one or more channels 161a . . . 161n. A channel is a dedicated communication portal into which a designated set of information is made available for a particular subgroup such as a particular supplier, one or more specific retail or distribution locations, a particular inventory or warehouse location, or a group of any of these. For example, a channel may provide access to data elements for a particular retail store, for a group of affiliated retail stores, or for products supplied by a particular supplier. Each channel will be securely protected by a public and private key, so that in order to access the channel a user (whether it be a consumer or a supplier) must present a private key that is recognized by the channel. Each user will have a profile that establishes an account, and each account will be associated with one or more channels. Then, when a user securely accesses the system, the user will receive access to only the channels that the user is authorized to access, and the system will provide the user with access to only data associated with those channels and not any other channel's data.

In addition to associating accounts with channels, different users may be given different sets of permissions. For example, some users may be given rights to edit and add data, such as inventory data and product descriptions, into the system. Others may not have such rights. In addition, each user's rights to access a particular class of data may be limited to ensure that a user does not receive access to private data of another user. For example, one supplier will not be given access to inventory, consumer-product interaction data or other consumer information, or sales data of another supplier, and no consumer may be given access to any profile data of any other consumer. To accomplish this, data elements may be associated with one or more classes, and each class may be regulated by any suitable access control protocol. For example, when a user electronic device first accesses the system and/or makes a request, it may present an authorization token to the system. An example of such a token is an encrypted hash that is unique to the user account and time period of access. The system may process the token using any suitable token based authentication process to decode and verify the token. Only if the system can verify the token will the user be given access to one or more particular data elements, classes of data, functions or services. This can help maintain privacy of the entity from which each data element originates.

To associate data with channels, when storing data in the consumer profile data store 102 or product information data store 103, the system may tag or otherwise associate each data element for each product with an identifier (ID) indicating the channel or channels to which the data belongs. The data in consumer profile data store 102 may include consumer-product interaction records for each profiled consumer, such as purchase records (such as product IDs, quantities purchased, dates of purchase, etc.), along with the consumer ratings for various products. The data in product information data store 103 may include, for example, characteristics and traits for products in the database, along with consumer ratings for the products. Methods for collecting and associating such information with products and consumers are described in U.S. Pat. Nos. 8,838,517 and 9,026,484, each to Dillon et al., and each of which is titled "Personal Taste Assessment System." The disclosures of U.S. Pat. Nos. 8,838,517 and 9,026,484 are fully incorporated into this document by reference.

To associate data with channels, the system may offer a channel creation user interface that enables users who act on behalf of a supplier to select products to associate with one or more channels.

Figure 2:
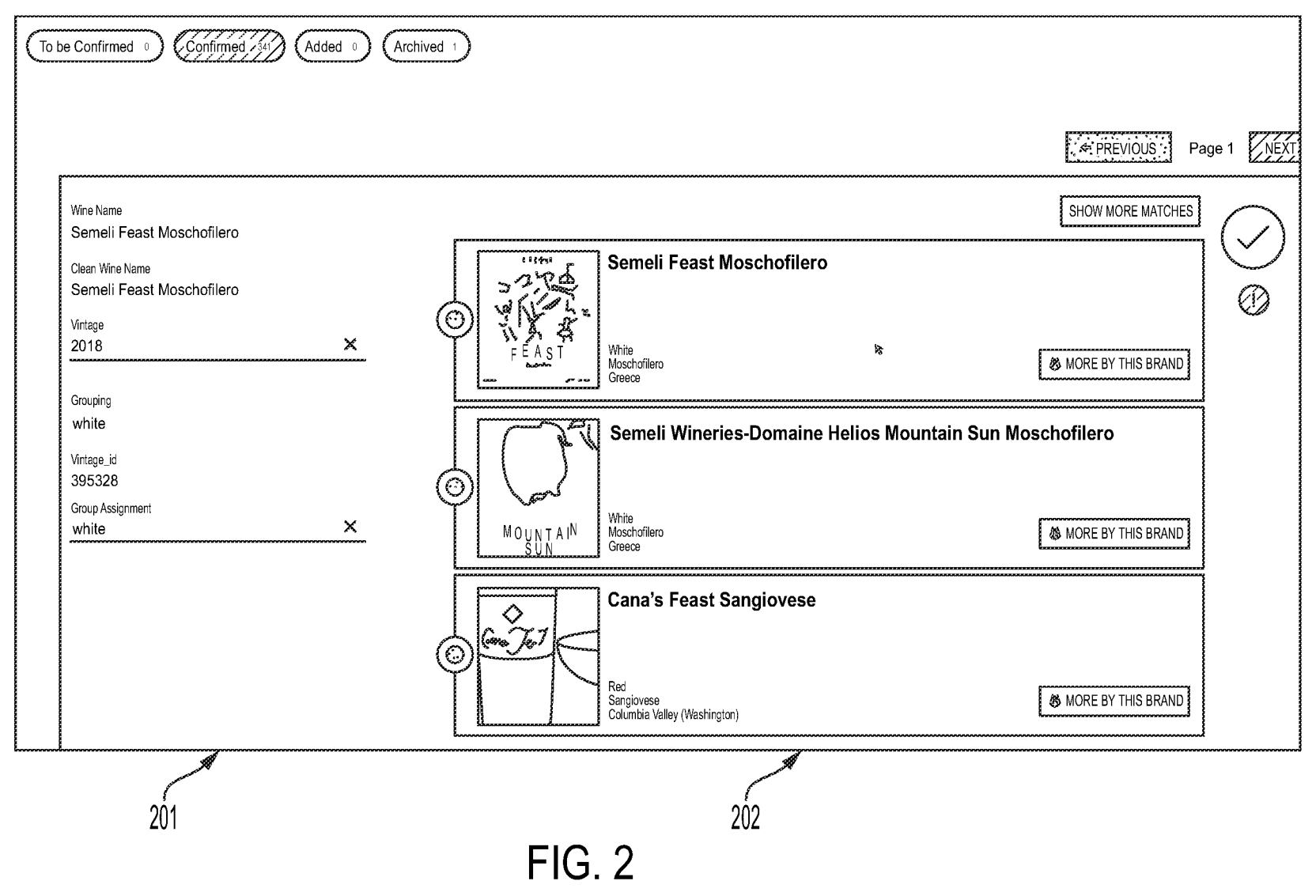

FIG. 2 illustrates a channel creation user interface by which a product supplier may associate products with its channel(s). The user interface may include a data entry field 201 by which the user may enter product information such as product name, supplier, vintage, type or the like for products that the supplier has in its inventory or plans to offer in its inventory. Alternatively or in addition to manual data entry, the system may automatically import product information via a data feed. This will be described in more detail in the context of FIGS. 3 and 11. For example, the system may receive an electronic feed of product information from a supplier on a daily or other periodic basis. The system may import this data into its database, regardless of the inventory management that the supplier uses. For example, the system may retrieve or receive a data feed in JavaScript object notation (JSON), extensible markup language (XML), or other format from the supplier and use semantic analysis to extract from the feed information that is relevant to the system's product information fields.

When any field is completed, the system may search its product database for candidate products having associated data that semantically matches that entered into the field(s).

Optionally, the data entry field may include a supplier product code field and a product description field, among other fields. The supplier may start by entering a value in any field. If the supplier enters a value in a product code field, the system may access its product database and determine whether that supplier has already associated a product with that code. If so, the system may automatically populate other fields with data that it retrieves from the database for that product, such as a product description. Similarly, if the supplier enters a value (such as a UPC code or product name) in the product description field, the system may access its product database and determine whether any product matches that description. If so, it may populate other fields with data that it retrieves from the database for the most likely matching product, such as a product description. The supplier may then add or correct any missing information and select a "validate" function upon completion. Once validated, the system may update its product database to add or remove any data elements that are to be associated with the product.

Returning to FIG. 2, in addition to the most likely match, the system also may retrieve alternate possible matching products and present the candidate products to the user in a candidate product detail field 202. The user may select one of the candidate products by activating a selector, in which case the product may then be added to the supplier's channel, at which point the supplier can add pricing and/or other information.

FIG. 3 illustrates how the system may associate a channel's products with external information that is channel-specific. For example, a supplier ID 301 for a product's data entry may be associated with a landing page address 302 such as a uniform resource locator (URL) for that product on the website of the supplier for whom the channel was created. In this way, when the product is presented to a user who is permitted to access a particular channel, the system may present the specific information that the channel's supplier has published (such as pricing information, inventory information and description) without requiring that the system actually obtain, store and associate that information with the product or channel.

Figure 4:
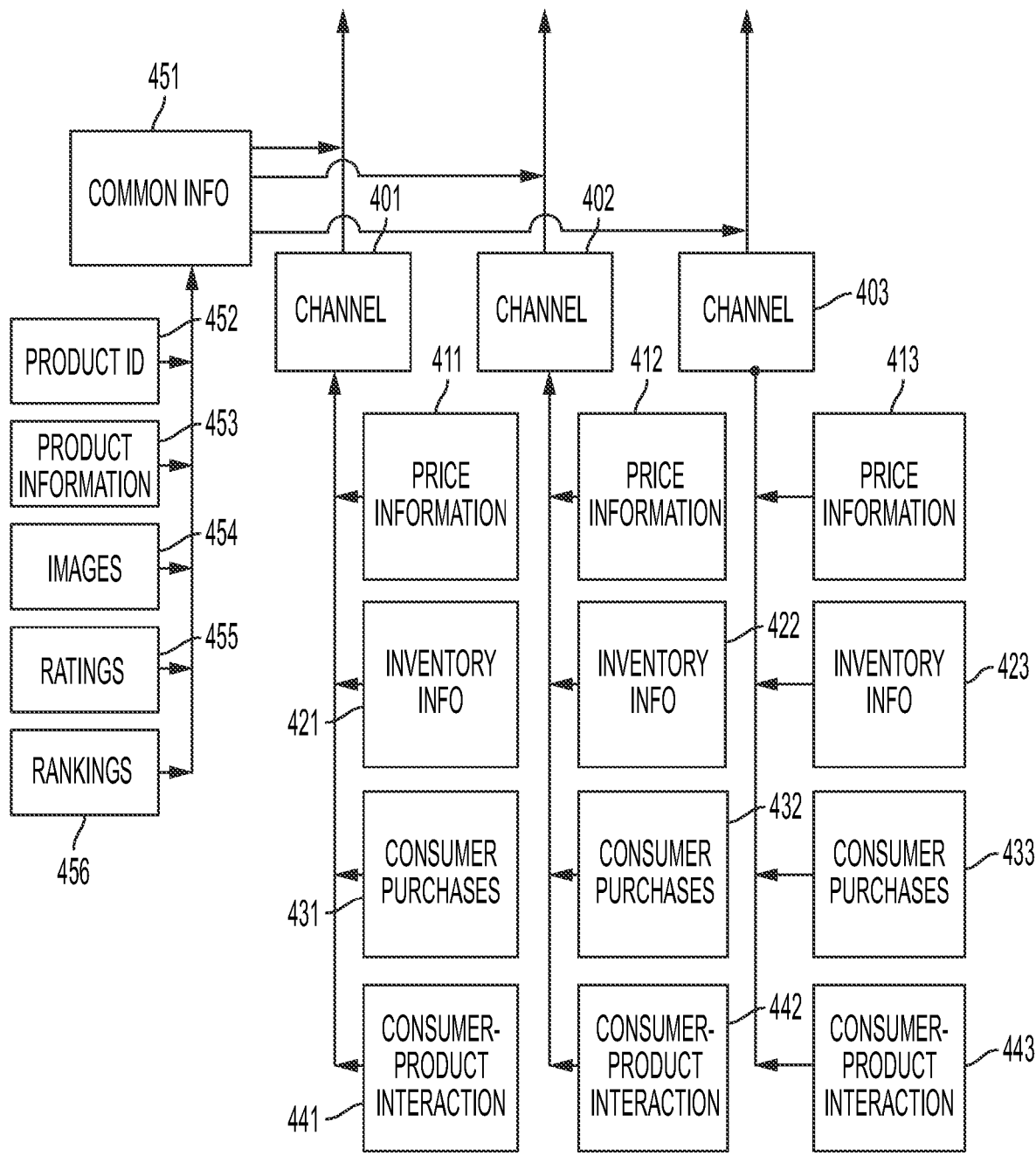
FIG. 4 illustrates an example encoding schema for products in a product database.

FIG. 4 illustrates how product data elements in the product database may be encoded to enable fast access to product data that is relevant to a channel. When a user (such as a representative of a supplier, or a consumer) is connected to a particular channel, that channel may provide access to data elements that are associated with a particular channel, along with data elements that may be common to all channels. For example, a user who is subscribed to channel 401 for a particular retailer may only see price information 411 and inventory information 421 (e.g., number of units available) for products that the supplier carries. A user who is subscribed to a different channel 402 will see different sets of price information 412 and inventory information 422. A user who is subscribed to yet another different channel 403 will see still different sets of price information 413 and inventory information 423. The various channels may be associated with different supplier, and/or a single supplier have multiple channels (for example each associated with subcategory of the supplier such as a unique storefront location). Each channel also may provide access to only consumer purchase history information 431, 432, 433 that contains records of purchases from consumers who acquired the products from the supplier or the subcategory for whom the channel applies. The consumer purchase history information may be part of or included along with a data set of consumer-product interaction records 441, 442, 443 with information such as records of other interactions that consumers had for various products such as searches that included the product name, page views of product listings, clicks on product hyperlinks on a website or storefront app, in-store ratings or ratings of events in which the product was presented, or other details describing the consumer's interaction with a product.

Optionally, if a supplier has multiple channels, the system may then also contain records from users who subscribe to the same channel. In addition, a single channel may have various subscribers to whom it assigns different access rights, so that subscribers can only access the data within a channel that they are authorized to view. For example, some users may have access to inventory information while a more limited set of users may have access to customer purchase information, to help maintain privacy of consumer information. Access control may be implemented with an access control list or other suitable security structure.

Optionally, the system's central database may collect and/or link to data that is contained in each channel's database. For example, a product that is associated with a unique product identifier may be stored in association with a channel identifier, and optionally also with a URL of a landing page at which details about the product may be found on the channel's website. Each product may have a unique identifier that the overall system maintains, and each channel may assign an ID (such as a SKU) for the product; the central server will store both IDs. To provide flexibility in data entry and avoid requiring users to enter precise matches of all data elements, the system may enable users to enter inventory items into the system with various descriptive fields such as UPC code or other identifier, product name, or other information. When the system receives one or more data points that match an item in the system's database, the system may present the remaining data points to the user as candidate information that the user may accept or reject. Ultimately, the system may ask the user to confirm when all data is correct, and it will store the confirmation in the database along with the data.

When the system receives product ratings from consumers (as described by way of example in the prior art systems described above), it will associate the rating information with the products but only make that information available to the appropriate suppliers via their specific channels. Optionally, the system, may aggregate rating information from multiple consumers from within a single channel, or across multiple channels of the platform. Optionally, the system may include third party rating information such as a professional reviewer's rating or an expert's tasting notes. One or more administrators or others with master credentials may be able to access product rating data for all channels, using processes such as those described in the prior art references mentioned above.

In addition to channel-specific information, some common information 451 may be made available to all channels. This may be general product information that is stored in a memory such as a product identification code 452, product identifying information 453 such as a product description (supplier name, brand name, product category, year produced, etc.), and/or images 454 such as product label images that contain product identifying information. This may also be non-personally-identifiable and/or aggregate data provided by users of the system, such as aggregate product ratings 455, rankings 456 of overall highest-selling products that are available from multiple suppliers, and the like.

FIG. 5 illustrates a channel collection user interface 501 by which a user such as a retailer or other supplier may create channel-specific collections of products. Before reaching or as part of this interface, the user or an administrator may define the channel to include a single retail location (such as a store or restaurant), a collection of locations. One user may have access to and manage multiple channels. For example, a manager of multiple restaurants may define one channel for the entire group plus additional, separate channels for each restaurant in the group. Other users may then be given the opportunity to access a channel by passing a secure authorization token to those users, and subsequently receiving the secure authorization token when the user requests access to the channel.

The channel collection user interface 501 may include actuators that enable the user to define a collection of products that consumers may purchase via the channel and/or from the channel's associated supplier. The system may include one or more product description fields 502 that enable the supplier provide product information for inventoried products and to define the characteristics of each product (as retrieved from the product database) that it will display to consumers who access the channel. The product information also may include details that may or may not be displayed to consumer, such as the number of instances of the product that the channel currently has in its inventory. Optionally, before reaching this field, the system may provide the user with the ability to identify the product that is in inventory through an automated label or package definition process. This will be described in more detail in the discussion of FIG. 12 below. Optionally, the system may include a privacy definition field 503 in which the supplier may define access restrictions for the collection, such as by limiting access to the supplier's inventory information to those consumers who present a code, or by making the collection visible only at a particular time and/or when the consumer's device is in a particular location (such as a private or time-limited event) as indicated by global positioning system or other position sensor data, or by removing access restrictions and making the collection public. Later, when logged in to a channel, a consumer will only be given access to product information that the consumer purchased from that channel's supplier, and/or which are available from the channel's supplier. This helps to securely shield other channels' information from the consumer, and it also ensures that when a consumer is logged into a channel the consumer's experience is not degraded by seeing products that are not available from the channel.

Figure 6:
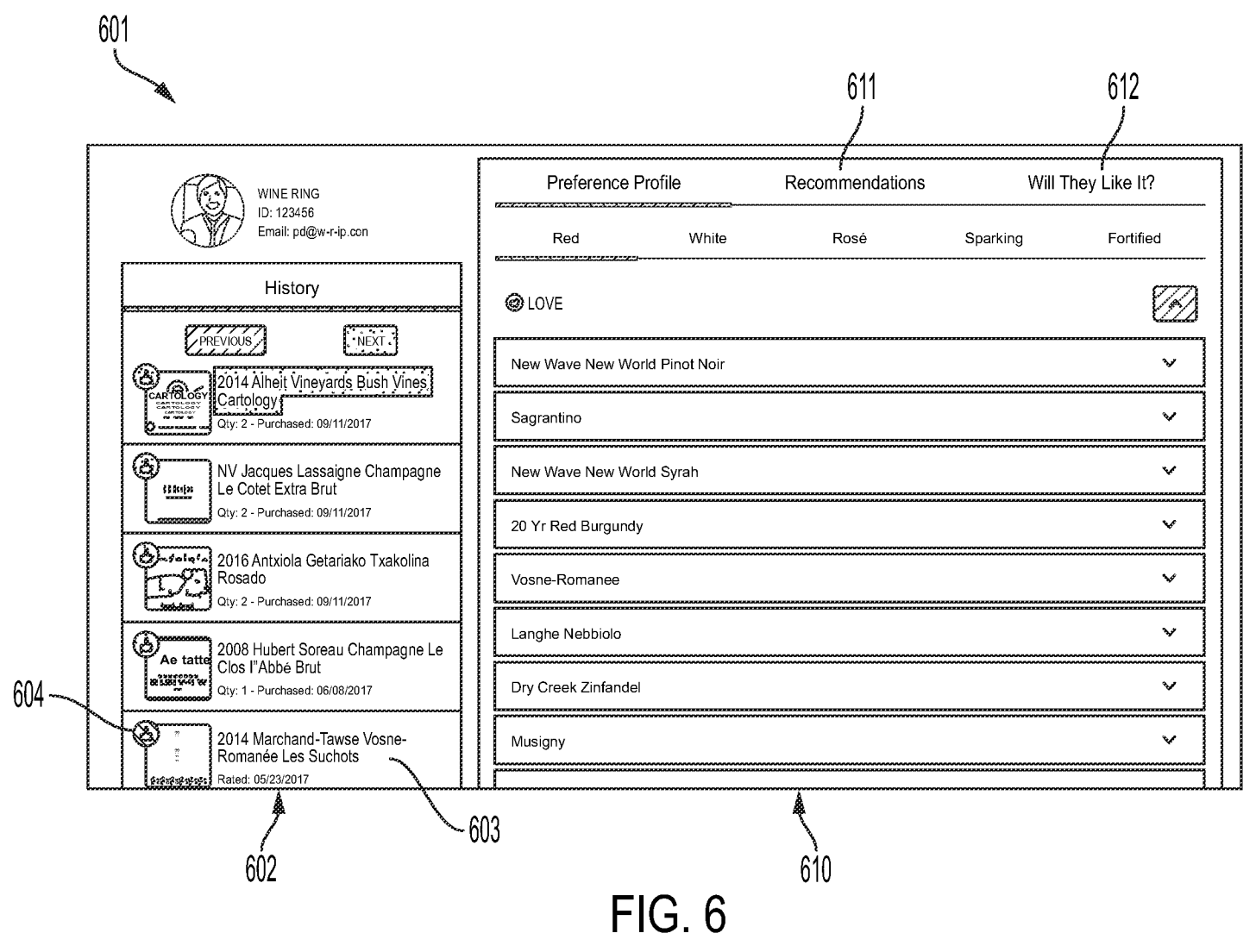

Channel creators may the use the system to create recommendations and manage profiles for their affiliated consumers. FIG. 6 illustrates a channel manager user interface 601 by which a channel manager may access a consumer profile 602 for a consumer who is subscribed to the channel and use the profile to generate product recommendations for the consumer. The consumer profile will include identifiers 603 for products that the consumer previously purchased, optionally with ratings 604 if the consumer rated those products. The system stores in the consumer's profile all purchases from all channels. As an option, it may only present a particular channel manager with secure profile information—i.e., information about those purchases that the consumer made from that channel's supplier, and not information about purchases from any other channel's supplier. Each purchase record in the consumer's profile will include a token corresponding to the channel and/or supplier from which the purchase was made, and the tokens can then be used to select products to recommend to the consumer for a particular channel. This helps ensure data security, as well as the privacy of individual consumers and other suppliers, by limiting the channel manager's access to details of the consumer's interaction with that channel's supplier, and not with third party channels' suppliers. The system may do this by associating a channel identifier with each purchase in the consumer's profile, and when extracting and presenting data from the consumer profile to a particular channel manager, only doing so for data points that are associated with the relevant channel identifier, along with data designated as either common (or public) information.

However, when generating product recommendations (which will be defined below), the system may consider all data within the consumer's profile, including both secure profile information and information for other channels regardless of which channel the data is associated with. To maintain consumer privacy, the system may not provide the channel manager with the consumer profile information and/or consumer-specific digital signal that the system considered when making the recommendations. Instead, the system will only provide the channel manager with the results of the recommendation process.

If the consumer did not provide the system with a rating for a particular purchased product, the system optionally may generate a proxy rating 605 for that product. The system may present proxy ratings 605 in a manner that is visibly distinguishable from actual consumer ratings 604, such as by different colors, different icons or other different identifiers. The system may apply any applicable rule set to generate proxy ratings. For example, the system may automatically assign a proxy rating of "like" to any product that the consumer has purchased, or to any product that the consumer has purchased a minimum number of times, such as at least twice. (This description will use a four-level rating schema of "love", "like", "so-so" and "dislike", but other rating schemas such as numeric ratings and/or letter ratings of any number of levels may be used.) As another example, the system may automatically assign a proxy rating of "love" to any product that the consumer has purchased at least a threshold number of times (such as three times), optionally within a time period. Thus, the system may also consider dates of purchase when generating the proxy rating, for example by assigning a "like" if the consumer purchased the product within a recent time window or assigning a "dislike" or mediocre rating if the consumer purchased the product more than a minimum time ago and did not re-purchase the product. Alternatively, the system may use other ratings received from the consumer for other products, and characteristics of those products and the purchased product, to generate a predicted rating using processes such as those described in U.S. Pat. No. 9,046,484, the disclosure of which is fully incorporated into this document by reference. In other embodiments, the system may use other data received from the supplier corresponding to non-purchase interactions by the customer to generate proxy ratings. Examples of non-purchase interaction information include customer search or bid history data as received by the supplier on the supplier's web platform or dedicated application. If the supplier's data indicated that a customer searched for or bid on a product, the system may assign a favorable proxy rating (such as "like") to that product in the customer's profile even though the customer did not actually purchase or rate the product. In addition, the system may assign a degree of appeal (example, "love" vs. "like", or a numeric measurement of appeal) to the product depending on the nature of the customer's interaction. For example, a bid on a product may indicate a relatively higher degree of appeal (example: "love" instead of "like") if the consumer bid on a product, even if the consumer did not win the bid. Thus, in practice, any digital signal could be considered if relevant to a proxy rating. In each case, the system may optionally require that digital signal (i.e., the unrated product interaction) have occurred within a threshold period of time, so that the signal is a true proxy and is not stale, which could indicate that the consumer previously tried the product but did not like the product enough to purchase it again. The system may enable the channel manager to define or modify the proxy rating rules in some embodiments.

The consumer profile 602 page of the channel manager user interface 601 may include a product recommendation window by which the user may access product-specific information such as specific ratings for products that the consumer purchased from the channel 610, optionally broken down by category of product as shown in FIG. 6. The product recommendation window may include a tab for receiving recommendations 611 of products that are in the channel's inventory and which the consumer is likely to enjoy. For example, if the system receives a request for a product from a channel but that channel's inventory data shows that the product is in limited supply or not available, the system may recommend an alternate product that both (a) has attributes that are similar to the requested product, and (b) is available in the inventory. The system also may start with a requested product (which may be considered to be a "reference" product) and recommend alternate products having similar or complimentary attributes, or having some attributes that are similar to the reference product and others which the consumer's profile indicates that the consumer likes, even if the reference product is available in the inventory for that channel. This feature can give a consumer who is not able to physically browse an inventory suggestions to try a product that the consumer would not have chosen unless the consumer happened to see the product when entering and browsing a physical storefront. The products may be of a similar category (such as different types of wines), or of different categories (such as wine and food pairings). For example, if a consumer selects a particular food product, the system may recommend a wine to accompany the food product. If the consumer accepts the wine recommendation, the system may recommend another food product that the consumer may enjoy with the wine at a second meal. This process can help a supplier introduce new products to consumers. It also may help a consumer identify new products that he or she may not even know to ask about, even if the consumer cannot access a physical storefront of the supplier due to proximity or other physical limitations.

The system may select and recommend products using processes such as those described in U.S. Pat. Nos. 8,838, 517 and 10,127,598, the disclosures of which are fully incorporated into this document by reference.

In addition, the product recommendation window may include a tab for receiving requests for predicted ratings 612 of products that are in the channel's inventory to identify whether the consumer is likely to like a particular product. The system may predict a person's preference for a specified item using processes such as those described in U.S. Pat. No. 9,046,484, the disclosure of which is fully incorporated into this document by reference.

FIG. 7 illustrates a data structure by which the system can securely separate secure profile data for a particular channel from profile data for other channels. FIG. 7 illustrates consumer profile records, in which each record includes a channel profile ID 701 and a contact address 702 (such as email or mobile phone number) for each user. Some consumers may have multiple profiles, each of which is associated with a different channel. However, if the system identifies the consumer as being affiliated with more than one channel, the system will generate a merged profile ID 703 for the consumer. The merged profile IDs 703 will be known to the system and/or its administrator, but not to any individual channels. The system may then use a consumer's merged profile ID to access all of the consumer's profiles (which may be individual profiles for each ID or a merged profile), and to generate product recommendations for the consumer, but it will not provide the channel with any profile information for the consumer other than that which the system received via the channel. The system may know that a single consumer is associated with multiple channels if the consumer opts in to create a profile on the system and self-identifies the channels to which the consumer subscribes. In addition or alternatively, the system may identify a consumer based on profile data (such as email address, phone number, name, residence, etc.) and automatically generate a merged profile if two consumer profile entries contain common identifying data for a consumer.

Figure 8:
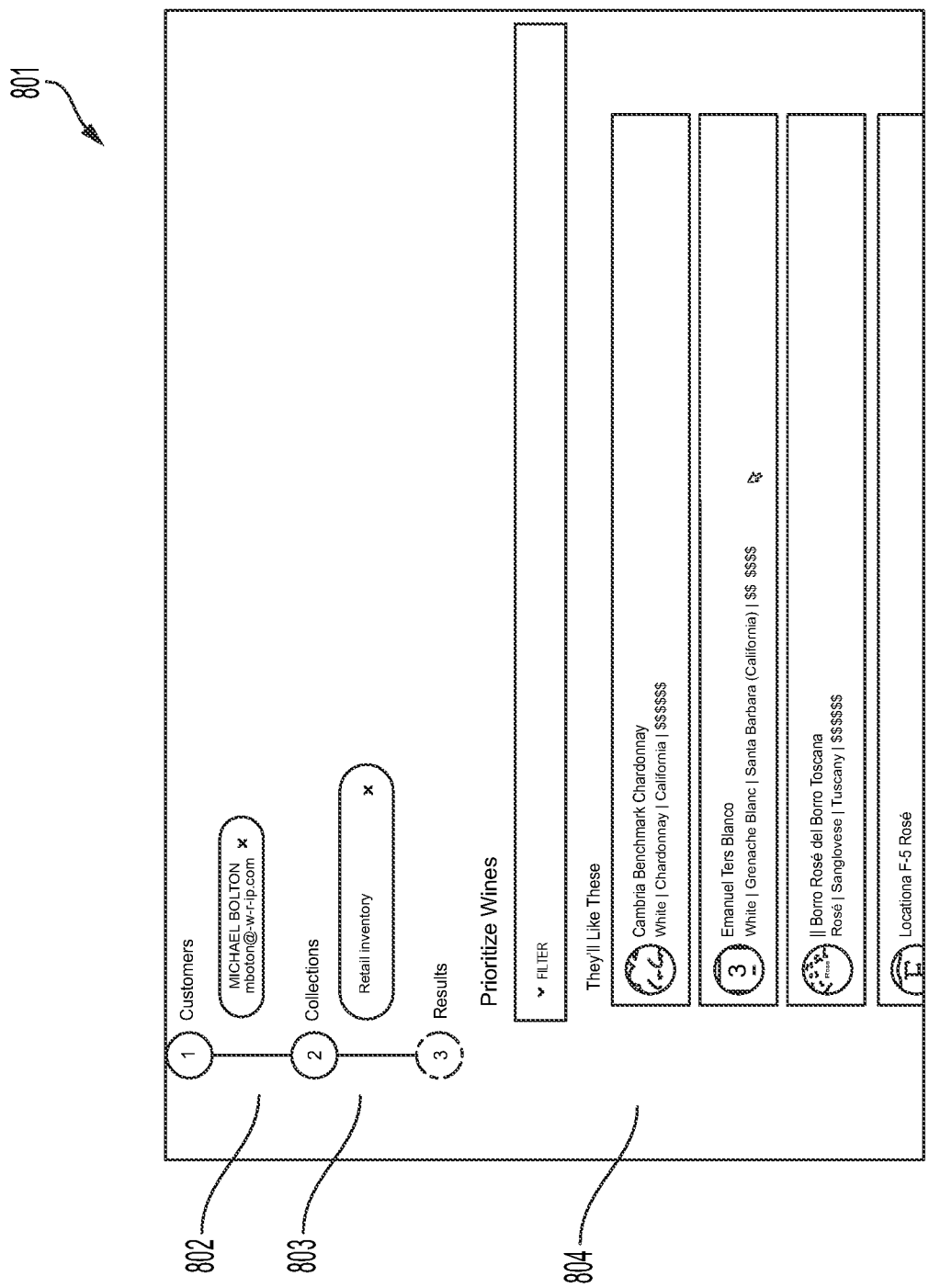
FIG. 8 illustrates a first element of an example campaign manager user interface.

FIG. 8 illustrates an example element of a customer selection user interface 801 by which a channel manager may select customers who should receive a communication, such as a product information campaign, and identify products to market to the customer via the campaign. The interface includes a customer selector field 802 by which the channel manager may select a customer from those having profiles that are associated with the channel. The customer selector field may allow free-form entry of data, it may be a search field, or it may be a drop-down or other field that accepts user input. The system will then use consumer profile information for that consumer to search the product database for products that are in the channel's inventory and which the consumer is likely to enjoy. The selection may be of those products (a) for which the consumer provided a rating that indicates that the consumer likes the product; or (b) the system predicts the consumer is likely to prefer using preference prediction methods such as those described above. The system may then present the candidate products in a product selection field 804. Optionally, the system may include a filter field 803 in which the channel manager may provide one or more criteria to limit the products that the system will recommend, and if such criteria are received the system will limit recommendations to those products meeting the criteria. For example, the criteria may be a product grouping, a price range, an inventory level, or some other criteria.

Figure 9:
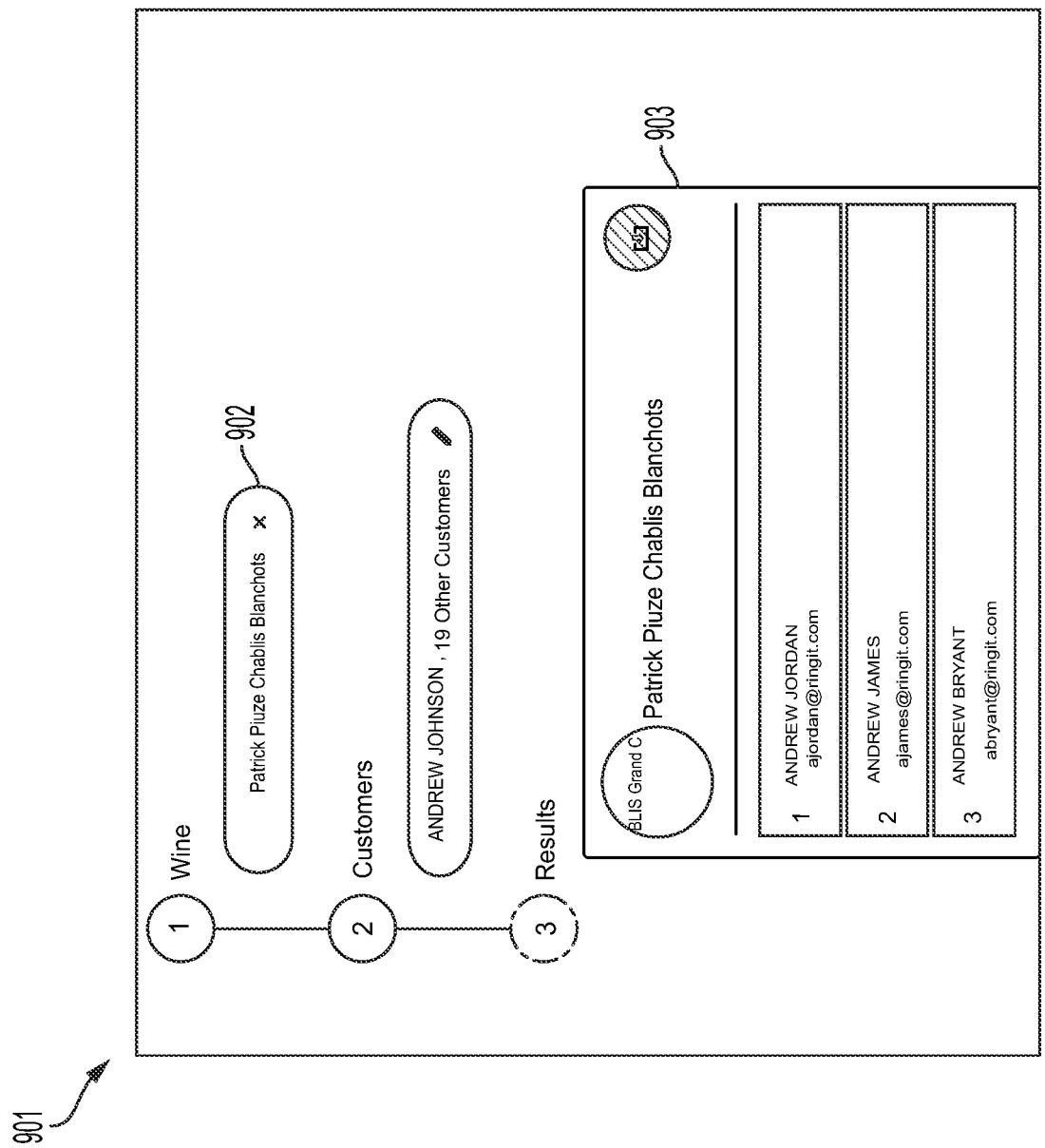
FIG. 9 illustrates a second element of an example campaign manager user interface.

FIG. 9 illustrates another element of a customer selection user interface 901 by which a channel manager may select customers who should receive a communication, such as a product information campaign. In this example, instead of selecting the customer the channel manager selects a product that is to be the subject of the campaign. The interface includes a product selector field 902 by which the channel manager may select a product that will be the topic of the campaign. The system will then use product information for that product and profile information for consumers who are associated with that channel to identify consumers who: (a) have provided a rating for that product in which the rating indicates that the consumer likes the product; or (b) the system predicts are likely to rate the product above a threshold level (i.e., are expected to like the product) using preference prediction methods such as those described above. The system will include a candidate consumer presentation field 903 that presents the identified consumers to the channel manager. Optionally, the system may present the identified consumers in a rank order, for example by presenting those consumers who are known to like the product first, followed by consumers who are likely to enjoy the product in descending order of expected preference rating.

FIG. 10 illustrates a communication campaign manager user interface 1001. Via this interface, the channel manager may develop communications to the consumer identified via previous processes such as those described above in the context of FIGS. 8 and 9. In this interface the channel manager can select consumers who are to receive personalized marketing campaigns. The channel manager may provide template information for the communication, and the system may then populate the template with results of the previous processes (such as the personalized product recommendation process of FIG. 8). The system may then interface with an electronic messaging campaign manager via an application programming interface (API) or other suitable connection to pass the information to the consumers.

As described above in the discussion of FIG. 2, the system may automatically import product information via a data feed. For example, the system may receive an electronic feed of product information from various retailers or other suppliers on a daily or other periodic basis. For example, the system may retrieve or receive a data feed in JSON, XML, or other format from each supplier and use semantic analysis to extract from the feed information that is relevant to the system's product information fields. The data feed may include information such as a number of items in inventory for products that the supplier actually has in inventory. Alternatively or in addition, the data feed for a particular supplier may include information for products that the supplier has ordered or is producing and thus expects to have in inventory soon.

In order to effectively process, handle and integrate supplier inventories, customer data and transactional data into our platform, the system may rationalize disparate data formats and organizational structures. It would not be practical to require suppliers to change the way they do business, nor would it be efficient to require human intervention to manipulate every supplier's different data format to fit within the system's structure. The system may therefore import this data into its database, regardless of the inventory management system that the supplier uses, by using semantic analysis to identify data fields that semantically match those of the system's product database, and by saving the values of those fields into the product information database. Any suitable semantic matching algorithm such as Wordnet, systems that use the S-match framework, and any of various string-based matchers, and the like. This enables the system to import data into a consistent data structure, regardless of the format in which, or system from which, the data is received. In addition, instead of using words the system may consider symbols such as a numeric representation (as in a mapping ID or product ID). When this document uses the term "semantic" in the context of semantic similarity, it is also intended to include such symbolic similarity. The words or symbols that are to be matched can be received via text input from a user, via a data feed, or extracted from an image such as via a label recognition process as described below in the context of FIG. 12.

To accomplish this objective, the system may perform a series of processing steps that enable the different data formats to be manipulated and rationalized into standardized approaches. In the end, all data may become represented in a relational database whereby data values are attributed to row and column pairs that can then be reconstructed into a matrix akin to a spreadsheet grid. Each row (or column) of the matrix represents a transaction or a customer or a product, and each column (or row) represents disparate fields for that associated transaction, customer or product, as the case may be.

To facilitate this, the system assigns one or more "mapping IDs" to each product as it is added to the database. A mapping ID is a character string (such as a number or alphanumeric string) that correlates a field in a data feed of a product for a particular merchant, retailer or other supplier to a field that is known to the system as part of the system's data structure. This is illustrated by way of example in FIG. 3, in which five products having different supplier IDs 301 are listed in five rows of the data set. Each product also may have a supplier ID 301 field value, which uniquely associates the product with a particular supplier. In this case, two of the listed products share common platform IDs 308 because they are two variations of the same product (as indicated by the field for product name attributes 312). In addition, each data entry includes a mapping ID 307, which is an identifier that maps a supplier-specific data field to a platform data field. The channel ID 309 attributes of each indicate that two of the products are associated with one channel but the third product is connected with a different channel.

The use of mapping IDs 307 allows the system to, upon identifying a group of mapping IDs for a particular supplier, quickly generate a data set of products that are specific to that supplier and enter the data into the system database. In this way, that supplier can be given access to its mapping ID-specific product data set without receiving access to any data that is not associated with that mapping ID (such as pricing or inventory data for the same product but from another supplier). For example, in FIG. 3, the data fields shown are product name attributes 312. The system may have a standard data field for product name attributes, which in this example is the first listing for the supplier of channel "714" that maps the supplier's unique identifier for the product to mapping ID value "20" and corresponding product attributes to their respective fields (e.g., product name, website URL, etc.). The data streams for multiple suppliers may use the mapping ID value "20" to represent their independent unique identifiers, even though those products may share the same product attributes. In some situations, certain suppliers may have a shared unique identifier which can be mapped to a specific mapping ID. In the example shown in FIG. 3, the supplier of channel "2" has a unique product name attribute field, which the system associates with mapping ID value "400", which is shared with other suppliers as a shared unique ID. In this way, when the system receives data for another supplier that also uses the shared unique ID mapped to mapping ID value "400", the product matching for supplier of channel "2" can automatically match the products for suppliers who utilize that unique ID. In FIG. 3, channel "714", the mapping ID value "20" indicates that the unique IDs used by the system for the supplier of that channel should only be used by that supplier. Other data element fields for each channel's data stream may be associated with different mapping IDs so that the system can relate each data element of the data stream to an appropriate system data field or fields.

Similarly, the user of channel IDs 309 allows the system to, upon identifying a channel ID to which a particular user subscribes, access the product information data store and generate a data set of product listings that are in that channel and give the user to that information, but not any information for other channels to which the user is not a subscriber. The use of platform IDs 308 enable the operator of the system to use a product ID to search for and retrieve all of the data that is associated with a particular product, which may include multiple entries for the product from multiple suppliers and/or for multiple channels.

Using semantic synonyms, a supplier can map its designated fields (columns) to one of the system's pre-defined field mappings relevant to the applicable data category. For example, a supplier can establish in its data feed setup that the supplier field named "customer email" is equal to the system's data mapping ID "203", which is "merchant_user_email". By the creation of these mappings of data feed fields to system fields, the system will know that when it reads in a data element with the parameter heading of "customer email" that it should be mapped to a "merchant_user_email" in the system.

If a supplier feeds data in a CSV (comma separated value) or "spreadsheet file" format, it will exist in a row/column two-dimensional structure, which can be readily broken down into the applicable values with row/column key pair combinations.

However, as is more commonly the case with Internet-based data-feeds, the data is often formatted as JSON or XML. JSON and XML (Extensible Markup Language) allow for more complex data structures, including embedding arrays of objects within any given data object, or even arrays of objects within arrays of objects. This creates more of a "multi-dimensional" structure that needs to be exploded and/or flattened before it can be converted into a two-dimensional data structure, like a matrix.

For example, one supplier may have its transaction history organized by date, with individual rows representing each product sold on each date. As such:

| Transaction # | Date | Customer | Product | Quantity |
|---|---|---|---|---|
| 1 | Jan. 1, 2020 | ABC | 12345 | 7 |
| 2 | Jan. 1, 2020 | ABC | 23456 | 3 |
| 3 | Jan. 1, 2020 | CDA | 12345 | 2 |

This data is easily represented in a simple matrix of rows and columns. Another supplier, however, may have its transactions grouped by customer, with an array representing the products purchased on a particular date. For example:

| Customer | Date | Transaction # | Product | Quantity |
|---|---|---|---|---|
| ABC | Jan. 1, 2020 | 1 | 12345 | 7 |
|  |  | 2 | 23456 | 3 |
| CDA | Jan. 1, 2020 | 3 | 12345 | 2 |

In this instance, the parent object, the Customer, has an array of objects underneath, representing the individual transactions/products that were purchased by the customer. Also, it is possible that any given child object could have an array, such as a transaction could have multiple products underneath that. In order to convert this structure into a two-dimensional matrix, it will be exploded and flattened. First, the system may to "explode" the parent by duplicating it "n" times, once for each row that needs to be created. Then, the system may "flatten" the children by copying them up to the newly exploded parent. In the simple example above, another ABC customer row is created with Transaction 2 (with corresponding product 23456) and is flattened into another row for parent ABC so as to end up with three rows. The rows can tie together cells of the matrix that contain related data points for particular products. In a complex array with multiple sub-arrays, this is a highly iterative process. By providing a mechanism for the supplier to establish up front the relevance (or irrelevance) of each data element in its data feed structure for purposes of importing into an inventory, customer list or transaction history, as the case may be, the system can automate the data ingestion process and iterate through the data structure automatically.

Also, by including within the data element fields certain "unique" identifier types (i.e., unique product IDs, unique customer IDs, etc.), the system may automatically assign previously matched products and customers from one import on future imports.

An example of product information that may be extracted from such a feed and stored in a structure data set is shown in FIG. 11. In some situations, when extracting data the system may determine whether the data to be stored in hierarchical structure (i.e., a three or more dimensional array) or in a flat (two-dimensional structure). When the system receives data for a new product that is not already in the database, it may create a new entry for that product using the mapping IDs that are assigned to that supplier's channel and storing the data elements for that product in the system fields that correspond to those mapping IDs.

Figure 12:
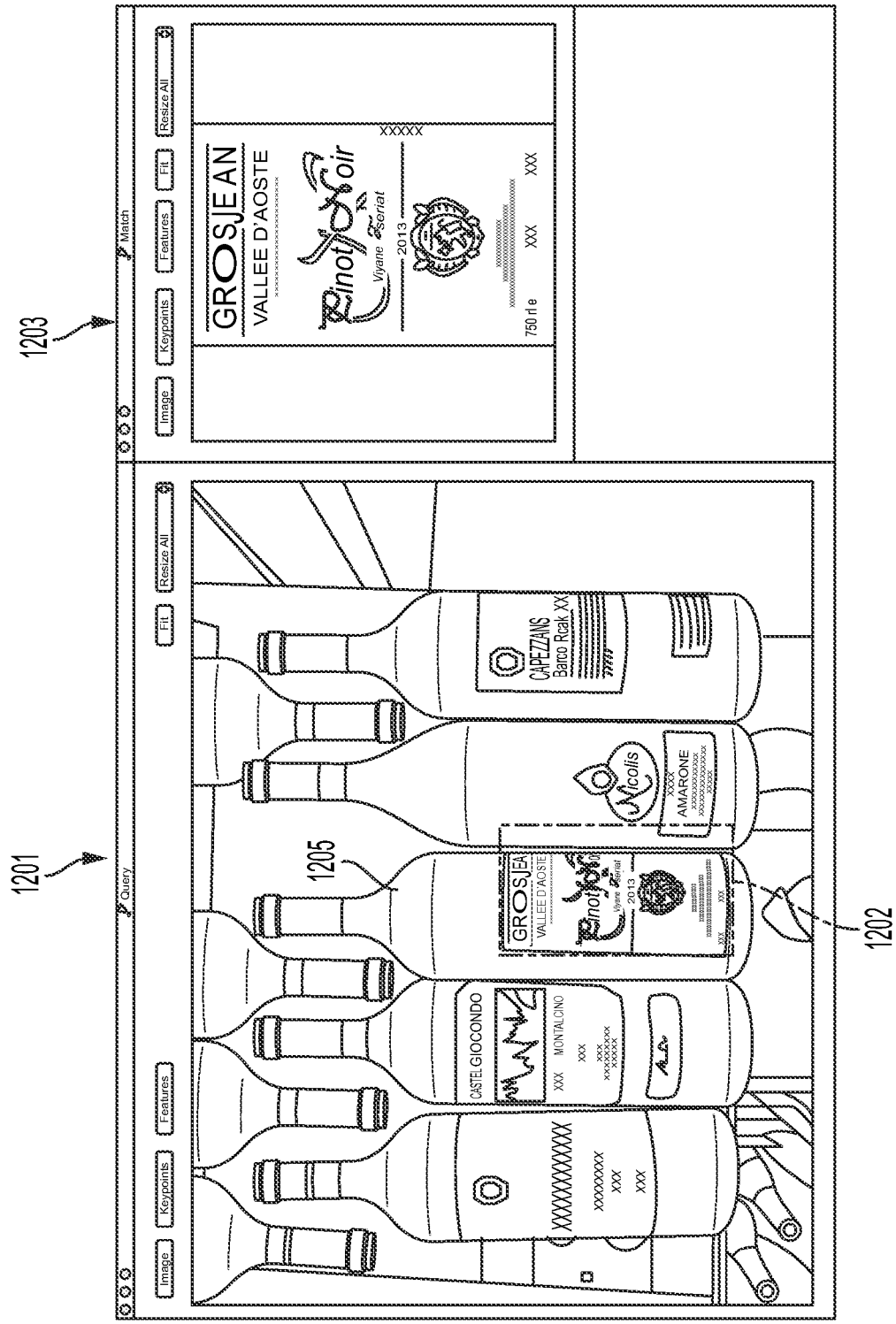
FIG. 12 describes an optional feature of a channel creation process in which image recognition is used to update an inventory and/or identify an inventoried product.

FIG. 12 illustrates a potential feature of the system by which the system may receive the product information for a product. For example, the feature of FIG. 12 may be used to initially receive product information in the process of FIG. 5, which is then used to define a channel's inventory, to create channels, or to create campaigns for individual products. As illustrated in FIG. 12, a high definition camera of a user device will capture an image 1201 that includes one or more products 1205. The system will define a bounding box 1202 around a label or other product indicia-containing segment of one of the products 1205. The bounding box may be manually defined by a user, automatically determined by the image processing system using an edge detector and/or classifier, or a combination of the two in which the system suggests a bounding box and the user modifies or accepts the suggestion. The system will then apply a recognition model to the image to extract product indicia (i.e., information that identifies the product, such as a product name, logo, barcode, or other identifying information) from a section of the image that is within the bounding box and that contains the label or other product indicia. The system may then access the product information data store and search it, using a classifier, to determine whether the product information data store includes an inventoried product with identifying information that is a likely match for the product indicia of the first product. The recognition model and classifier may be stored in memory of any of the electronic devices shown in FIG. 1. Any suitable image recognition model may be used, such as the very deep convolutional networks for large-scale image recognition that are known as VGG-16, as well as the ResNet50 model. Any suitable image classifier may be used, such as the many known classifiers that use convolutional neural networks, including but not limited to ImageNet.

Figure 13:
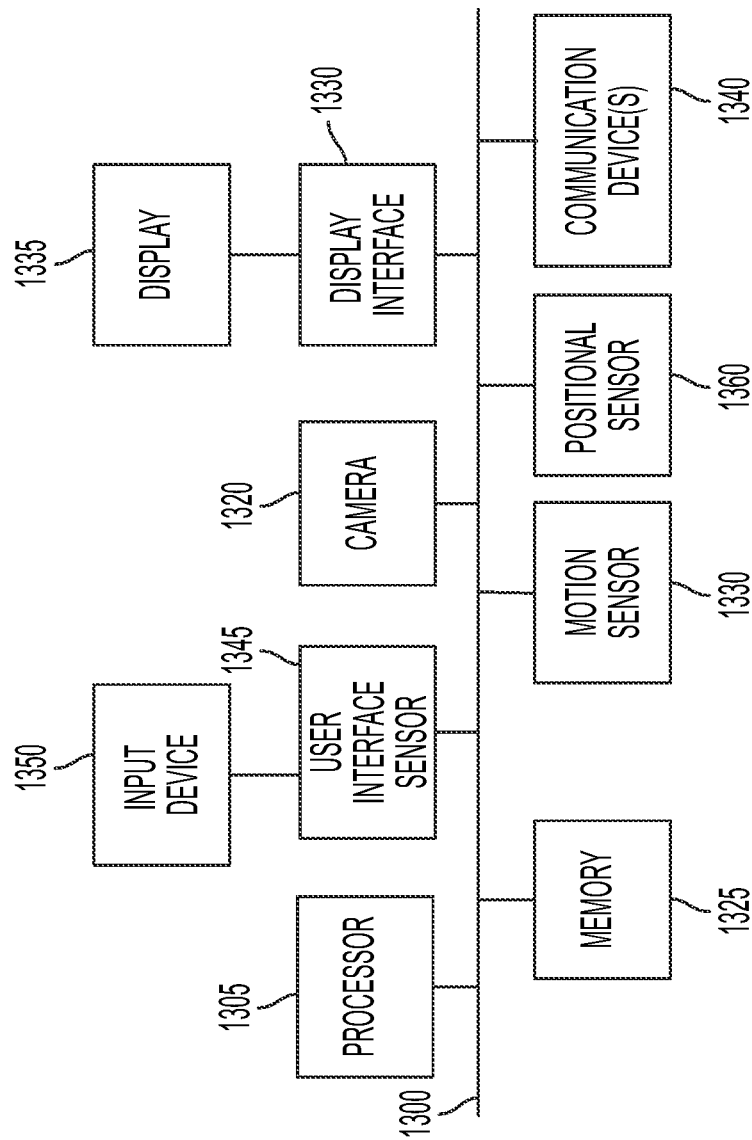
FIG. 13 illustrates example hardware that may be incorporated into various elements of the system.

FIG. 13 depicts an example of internal hardware that may be included in any of the electronic components of the system, such as the user's smartphone or a local or remote computing device in the system. An electrical bus 1300 serves as an information highway interconnecting the other illustrated components of the hardware. Processor 1305 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 1325. A memory device may include a single device or a collection of devices across which data and/or instructions are stored.

An optional display interface 1330 may permit information from the bus 1300 to be displayed on a display device 1335 in visual, graphic or alphanumeric format. An audio interface and audio output (such as a speaker) also may be provided. Communication with external devices may occur using various communication devices 1340 such as a wireless antenna, a radio frequency identification (RFID) tag and/or short-range or near-field communication transceiver, each of which may optionally communicatively connect with other components of the device via one or more communication system. The communication device 1340 may be configured to be communicatively connected to a communications network, such as the Internet, a local area network or a cellular telephone data network.

The hardware may also include a user interface sensor 1345 that allows for receipt of data from input devices 1350 such as a keyboard, a mouse, a joystick, a touchscreen, a touch pad, a remote control, a pointing device and/or microphone. Digital image frames also may be received from a camera 1320 that can capture video and/or still images, such as a high definition camera that incorporated into any of the user electronic devices of FIG. 1. The system also may include a positional sensor 1380 and/or motion sensor 1370 to detect position and movement of the device. Examples of motion sensors 1370 include gyroscopes or accelerometers. Examples of positional sensors 1380 include a global positioning system (GPS) sensor device that receives positional data from an external GPS network.

Terminology that is relevant to this disclosure includes:

In this document, the term "connected", when referring to two physical structures, means that the two physical structures touch each other. Devices that are connected may be secured to each other, or they may simply touch each other and not be secured.

In this document, the term "electrically connected", when referring to two electrical components, means that a conductive path exists between the two components. The path may be a direct path, or an indirect path through one or more intermediary components.

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 13.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

The term "classifier" means an automated process by which an artificial intelligence system may assign a label or category to one or more data points. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor. Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have misclassified. A classifier will be implemented by a processor executing programming instructions, and it may operate on large data sets such as images, documents, and/or other data.

The term "model" refers to a set of algorithmic routines and parameters, stored on a computer-readable medium, that can predict an output(s) of a real-world process (e.g., recognition of a product by its label, or prediction a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning models utilize various types of statistical analyses, machine learning models are distinguished from statistical analyses by virtue of the ability to learn without explicit programming and being rooted in computer technology.

The term "bounding box" refers to a rectangular box that represents the location of an object. A bounding box may be represented in data by x- and y-axis coordinates $[x_{max}, y_{max}]$ that correspond to a first corner of the box (such as the upper right corner), along with x- and y-axis coordinates $[x_{min}, y_{min}]$ that correspond to the corner of the rectangle that is opposite the first corner (such as the lower left corner). It may be calculated as the smallest rectangle that contains all of the points of an object, optionally plus an additional space to allow for a margin of error. The points of the object may be those detected by one or more sensors, such as pixels of an image captured by a camera, or from user input that identifies the points.

Therefore, various embodiments may include an inventory management system that includes a processor and a computer readable memory device containing a product information data store. The product information data store includes inventory information for various products, each of which is associated with one or more channels. The system also includes a computer-readable memory device containing a consumer profile data store. The consumer profile data store holds consumer-product interaction records, each of which comprises consumer purchase or other interaction event information and product rating information for one or more of the products, and each of which is associated with one of the channels. The system also includes a computer-readable memory device containing programming instructions that are configured to cause the processor to generate and output, on a display device, a channel manager user interface via which the system will: (i) receive, from a channel manager user for a first channel, an identifier for a consumer; (ii) access the consumer profile data store and retrieve secure profile data for the consumer, wherein the secure profile data comprises purchase records that are associated with a token for the first channel and does not include any product interaction records that are associated with tokens for any other channel; (iii) access the product information data store to identify products that are in an inventory of the first channel; (iv) use the consumer profile data, including both the secure profile data and profile data that is associated with tokens for one or more other channels, to generate one or more product recommendations for the consumer, wherein the one or more product recommendations are for one or more products in the inventory; and (v) output the one or more product recommendations on the display device.

Other embodiments may include a system for securely managing inventory data, in which the system includes a processor and a computer readable memory device containing a product information data store. The product information data store comprises inventory information for a plurality of products. Each product in the data store is associated with one or more secure channels in which the inventory information for each product includes mapping IDs for each channel with which the product is associated. The mapping IDs associate data elements in the record to data element fields in the data store to enable secure intake of new product data and secure retrieval of data that is associated with a particular channel. The system also includes a computer-readable memory device containing a consumer profile data store. The consumer profile data store holds consumer-product interaction records, each of which comprises consumer-product interaction event information and rating information for one or more of the products, and each of which is associated with one of the channels. The system also includes a computer-readable memory device containing programming instructions that are configured to cause the processor to generate and output, on a display device, a channel manager user interface via which the system will: (i) receive, from a channel manager user for a first channel, an identifier for a consumer; (ii) access the consumer profile data store and retrieve secure profile data for the consumer, wherein the retrieving accesses only consumer-product interaction records that are associated with a token for the first channel and excludes any consumer-product interaction records that are associated with tokens for any other channel; (iii) access the product information data store to identify products that are in an inventory of the first channel; (iv) use the consumer profile data, including both the secure profile data and profile data that is associated with tokens for one or more other channels, to generate one or more product recommendations for the consumer, wherein the one or more product recommendations are for one or more products in the inventory; and (v) output the one or more product recommendations on the display device.

Optionally, the programming instructions to receive the product information for a plurality of inventoried products and determine whether the inventoried product is in the product information data store may comprise instructions to, for at least a first product of the inventoried products, cause a high definition camera to capture an image that includes the first product. The capturing may include defining a bounding box around section of the first product that contains product indicia. The system may apply a recognition model to the image to extract the product of indicia from a section of the image that is within the bounding box. The system may use a classifier to determine whether the product information data store includes an inventoried product with identifying information that is a likely match for the product indicia.

Optionally, the instructions to access the product information data store to identify products that are in the inventory of the first channel comprise instructions to: (i) identify a channel ID for the first channel; and (ii) maintain data security by extracting, from the product information data store, product data records that are associated with the channel ID and not any product data records that are associated with any other channel ID.

Optionally, the channel manager user interface may include a channel collection user interface with one or more actuators by which the system will receive, from the channel manager user, for the first channel: (i) a definition for the channel, wherein the definition for the channel comprises a subgroup to which the channel relates; and (ii) a definition for a collection of products that are available from the channel. The definition for the collection comprises product description information received from a product description field, and also one or more access restrictions for the collection.

Optionally, the instructions to output the secure profile data on the display device may comprise instructions to: (i) display information for a plurality of products that are in the consumer-product interaction records for the consumer; (ii) for each product for which the consumer profile data store holds a rating received from the consumer, display the rating with the information for that product; and (iii) for an unrated product for which the consumer profile data store does not hold a rating received from the consumer, generate a proxy rating for the unrated product and display the proxy rating with the information for the unrated product. The instructions to generate the proxy rating may comprise instructions to use one or more of the following to generate the proxy rating: (a) a function of a number of times that the consumer purchased the unrated product; or (b) a date on which the consumer purchased of the unrated product. The instructions to generate the proxy rating also may comprise instructions to access the product information data store and retrieve a plurality of characteristic values for the unrated product, and then determine whether the retrieved characteristic values for the product correspond to one or more indicators of preference in a preference model for the consumer, wherein the preference model represents associations between the consumer's ratings of products and a plurality of product characteristics. As yet another option, the instructions to generate the proxy rating may comprise instructions to: (x) receive, from the supplier, indicia of a non-purchase interaction by the consumer with the unrated product; and (y) upon determining that indicia indicate that the consumer interacted with the unrated product, assign a favorable proxy rating to that product.

Optionally, the system may include additional programming instructions that are configured to cause the processor to generate and output, on a display device, a channel creation user interface via which the system will: (i) receive, from a user, product information for a plurality of inventoried products; (ii) for each inventoried product for which product information is received, determine whether the inventoried product is already in the product information data store; (iii) if the inventoried product is not already in the product information data store, add the product information for the inventoried product to the product information data store; (iv) if the inventoried product is already in the product information data store, present additional product information from the product information data store to the user to accept or modify; and (v) upon receiving confirmation from the user, update the product information data store to include the product information for the inventoried product and associate the inventoried product with the first channel. The programming instructions to update the product information data store to include the product information for the inventoried product and associate the inventoried product with the first channel may comprise instructions to add a record for the inventoried product to the data store by identifying a channel ID for the first channel and using a mapping ID for the record to associate data elements in the record to data element fields for the first channel in the product information data store. The system also may include programming instructions that are configured to cause the processor to associate the inventoried product with an address for a landing page for the inventoried product on a website of the first channel.

Optionally, the system may include additional programming instructions that are configured to cause the processor to generate and output a customer selection manager via which the system may: (i) receive, via the channel manager user interface, a selection of a consumer; (ii) receive, via the channel manager user interface, one or more product screening criteria; (iii) use the consumer profile data, including both the secure profile data and profile data that is associated with tokens for one or more other channels, to generate one or more product recommendations for the consumer, wherein the product recommendations are for products in the inventory that meet the screening criteria; (iv) automatically generate a message that includes the product recommendations; and (v) transmit the message to the consumer.

Optionally, the system may include additional programming instructions that are configured to cause the processor to generate and output a customer selection manager via which the system may: (i) receive, via the channel manager user interface, a selection of a product; (ii) access the consumer profile data to identify one or more consumers who are associated with the channel; (iii) for each of the identified consumers, generate a predicted rating for the product; (iv) select, from the identified consumers, a group of consumers whose predicted rating exceeds a threshold; (v) automatically generate a message that includes information about the identified product; and (vi) transmit the message to the group of consumers.

Optionally, the programming instructions to generate one or more product recommendations for the consumer comprise instructions to: (i) determine that the consumer has requested a product of a first product category; (ii) identify a second product category; (iii) use one or more attributes of the requested product and the secure profile data to select, from the inventory, one or more products of the second product category; and (iv) include the selected one or more products in the one or more product recommendations.

Optionally, the system may include additional programming instructions that are configured to cause the processor to: (i) receive, via a data feed from each of a plurality of suppliers, inventory information for a plurality of products; (ii) extract, from each data feed, the inventory information for each of the plurality of suppliers by using semantic synonyms to map each of a plurality of data fields in the data feed to a pre-defined field mapping that matches a system field in the data store, and extracting the data from each of the mapped data fields, and save the extracted data to a matched system field; and (iii) update the product information data store to include the extracted inventory information for each product that is associated with the supplier in the product information data store.

The features and functions described above, as well as alternatives, may be combined into many other different systems or applications. Various alternatives, modifications, variations or improvements may be made by those skilled in the art, each of which is also intended to be encompassed by the disclosed embodiments.

What is claimed is:

1. An inventory management system, comprising:
a processor:
a computer readable memory device containing a product information data store, wherein the product information data store comprises inventory information for a plurality of products, and wherein each product is associated with one or more channels;
a computer-readable memory device containing a consumer profile data store, wherein the consumer profile data store holds consumer-product interaction records, each of which comprises consumer-product interaction event information and rating information for one or more of the products, and each of which is associated with one of the one or more channels; and
a computer-readable memory device containing programming instructions that are configured to cause the processor to generate and output, on a display device, a channel manager user interface via which the system will:
receive, from a channel manager user for a first channel, an identifier for a consumer,
access the consumer profile data store and retrieve secure profile data for the consumer, wherein the retrieving accesses only consumer-product interaction records that are associated with a token for the first channel and excludes any consumer-product interaction records that are associated with tokens for any other channel,
access the product information data store to identify products that are in an inventory of the first channel,
use the consumer profile data, including both the secure profile data and profile data that is associated with tokens for one or more other channels, to generate one or more product recommendations for the consumer, wherein the one or more product recommendations are for one or more products in the inventory, and
output the one or more product recommendations on the display device.

2. The system of claim 1, wherein the programming instructions to output the secure profile data on the display device comprise instructions to:
display information for a plurality of products that are in the consumer-product interaction records for the consumer;
for each product for which the consumer profile data store holds a rating received from the consumer, display the rating with the information for that product; and
for an unrated product for which the consumer profile data store does not hold a rating received from the consumer, generate a proxy rating for the unrated product and display the proxy rating with the information for the unrated product.

3. The system of claim 2, wherein the programming instructions to generate the proxy rating comprise instructions to use one or more of the following to generate the proxy rating:
a function of a number of times that the consumer purchased the unrated product; or
a date on which the consumer purchased of the unrated product.

4. The system of claim 2, wherein the programming instructions to generate the proxy rating comprise instructions to:
access the product information data store and retrieve a plurality of characteristic values for the unrated product; and
determine whether the retrieved characteristic values for the product correspond to one or more indicators of preference in a preference model for the consumer, wherein the preference model represents associations between the consumer's ratings of products and a plurality of product characteristics.

5. The system of claim 2, wherein the programming instructions to generate the proxy rating comprise instructions to:
receive indicia of a non-purchase interaction by the consumer with the unrated product; and
upon determining that indicia indicate that the consumer interacted with the unrated product, assign a favorable proxy rating to that product.

6. The system of claim 1, further comprising additional programming instructions that are configured to cause the processor to generate and output, on a display device, a channel creation user interface via which the system will:
receive, from a user, product information for a plurality of inventoried products;
for each inventoried product for which product information is received, determine whether the inventoried product is already in the product information data store;
if the inventoried product is not already in the product information data store, add the product information for the inventoried product to the product information data store;
if the inventoried product is already in the product information data store, present additional product information from the product information data store to the user to accept or modify; and
upon receiving confirmation from the user, update the product information data store to include the product information for the inventoried product and associate the inventoried product with the first channel.

7. The system of claim 6, wherein the programming instructions to update the product information data store to include the product information for the inventoried product and associate the inventoried product with the first channel comprise instructions to add a record for the inventory product to the product information data store in which the record includes:
a channel ID for the first channel; and
mapping IDs for a supplier that is associated with the first channel, in which the mapping IDs associate data elements in the record to data element fields in the product information data store.

8. The system of claim 6, further comprising programming instructions that are configured to cause the processor to associate the inventoried product with an address for a landing page for the inventoried product on a website of the first channel.

9. The system of claim 1, wherein the programming instructions to receive the product information for a plurality of inventoried products and determine whether the inventoried product is in the product information data store comprise instructions to, for at least a first product of the inventoried products:
cause a high definition camera to capture an image that includes the first product, wherein the capturing includes defining a bounding box around a section of the first product that contains product indicia;

apply a recognition model to the image to extract the product indicia from a section of the image that is within the bounding box; and use a classifier to determine whether the product information data store includes an inventoried product with identifying information that is a likely match for the product indicia.

10. The system of claim 1, further comprising additional programming instructions that are configured to cause the processor to generate and output a customer selection manager via which the system may:

receive, via the channel manager user interface, one or more product screening criteria;

use the consumer profile data, including both the secure profile data and profile data that is associated with tokens for one or more other channels, to generate the one or more product recommendations for the consumer, wherein the one or more product recommendations are for products in the inventory that meet the one or more product screening criteria;

automatically generate a message that includes the one or more product recommendations; and transmit the message to the consumer.

11. The system of claim 1, further comprising additional programming instructions that are configured to cause the processor to generate and output a customer selection manager via which the system may:

receive, via the channel manager user interface, a selection of a product;

access the consumer profile data to identify one or more consumers who are associated with the first channel;

for each of the identified one or more consumers, generate a predicted rating for the product;

select, from the identified one or more consumers, a group of consumers whose predicted rating exceeds a threshold;

automatically generate a message that includes information about the selected product; and transmit the message to the group of consumers.

12. The system of claim 1, wherein the programming instructions to generate the one or more product recommendations for the consumer comprise instructions to:

determine that the consumer has requested a product of a first product category;

identify a second product category;

use one or more attributes of the requested product and the secure profile data to select, from the inventory, one or more products of the second product category; and include the selected one or more products in the one or more product recommendations.

13. The system of claim 1, wherein the instructions to access the product information data store to identify products that are in the inventory of the first channel comprise instructions to:

identify a channel ID for the first channel; and extract, from the product information data store, product data records that are associated with the channel ID and not any product data records that are associated with any other channel ID.

14. The system of claim 1, wherein the channel manager user interface comprises a channel collection user interface that comprises one or more actuators by which the system will receive, from the channel manager user, for the first channel:

a definition for the first channel, wherein the definition for the first channel comprises a subgroup to which the first channel relates; and a definition for a collection of products that are available from the first channel, wherein the definition for the collection comprises:

product description information received from a product description field, and one or more access restrictions for the collection.

15. The system of claim 1, further comprising additional programming instructions that are configured to cause the processor to:

receive, via a data feed from each of a plurality of suppliers, inventory information for a plurality of products;

extract, from each data feed, the inventory information for each of the plurality of suppliers; and update the product information data store to include the extracted inventory information for each product that is associated with the supplier in the product information data store.

16. The system of claim 15, wherein the programming instructions to extract the inventory information from each data feed comprise instructions to, for each data feed:

use semantic synonyms to map each of a plurality of data fields in the data feed to a pre-defined field mapping that matches a system field in the data store; and extract data from each of the mapped data fields, and save the extracted data to a matched system field.

* * * * *